United States Patent [19]

Bridigum et al.

[11] 3,902,875

[45] Sept. 2, 1975

[54] MULTIPLE FILTER APPARATUS

[75] Inventors: Robert J. Bridigum; William H. Glass, both of Pittsburgh, Pa.

[73] Assignee: Westinghouse Air Brake Company, Wilmerding, Pa.

[22] Filed: Dec. 19, 1973

[21] Appl. No.: 426,033

[52] U.S. Cl. ........................ 55/162; 55/179; 55/387

[51] Int. Cl.[2] ........................................... B01D 53/00

[58] Field of Search .................. 55/33, 35, 160–163, 55/179, 387

[56] References Cited

UNITED STATES PATENTS

| | | | |
|---|---|---|---|
| 3,192,686 | 7/1965 | Berkey et al. | 55/33 X |
| 3,323,291 | 6/1967 | Kern | 55/162 |
| 3,464,186 | 9/1969 | Hankison et al. | 55/163 |
| 3,486,303 | 12/1969 | Glass et al. | 55/162 |
| 3,572,008 | 3/1971 | Hankison et al. | 55/33 |

*Primary Examiner*—John Adee
*Assistant Examiner*—Richard W. Burks
*Attorney, Agent, or Firm*—R. W. McIntire, Jr.

[57] ABSTRACT

A multiple filter apparatus interposed in a compressed air system for removing moisture from compressed air supplied by a compressor to a storage reservoir, said apparatus having at least two filter units and control means for effecting periods of alternate purging of moisture from each of said filter units and alternate filtering operation of each of the filter units, such that one filter unit is being purged while the other is filtering, and vice versa, at all times, said control means including timing means for determining a preselected duration of said periods independently of the compressor operating cycles.

6 Claims, 1 Drawing Figure

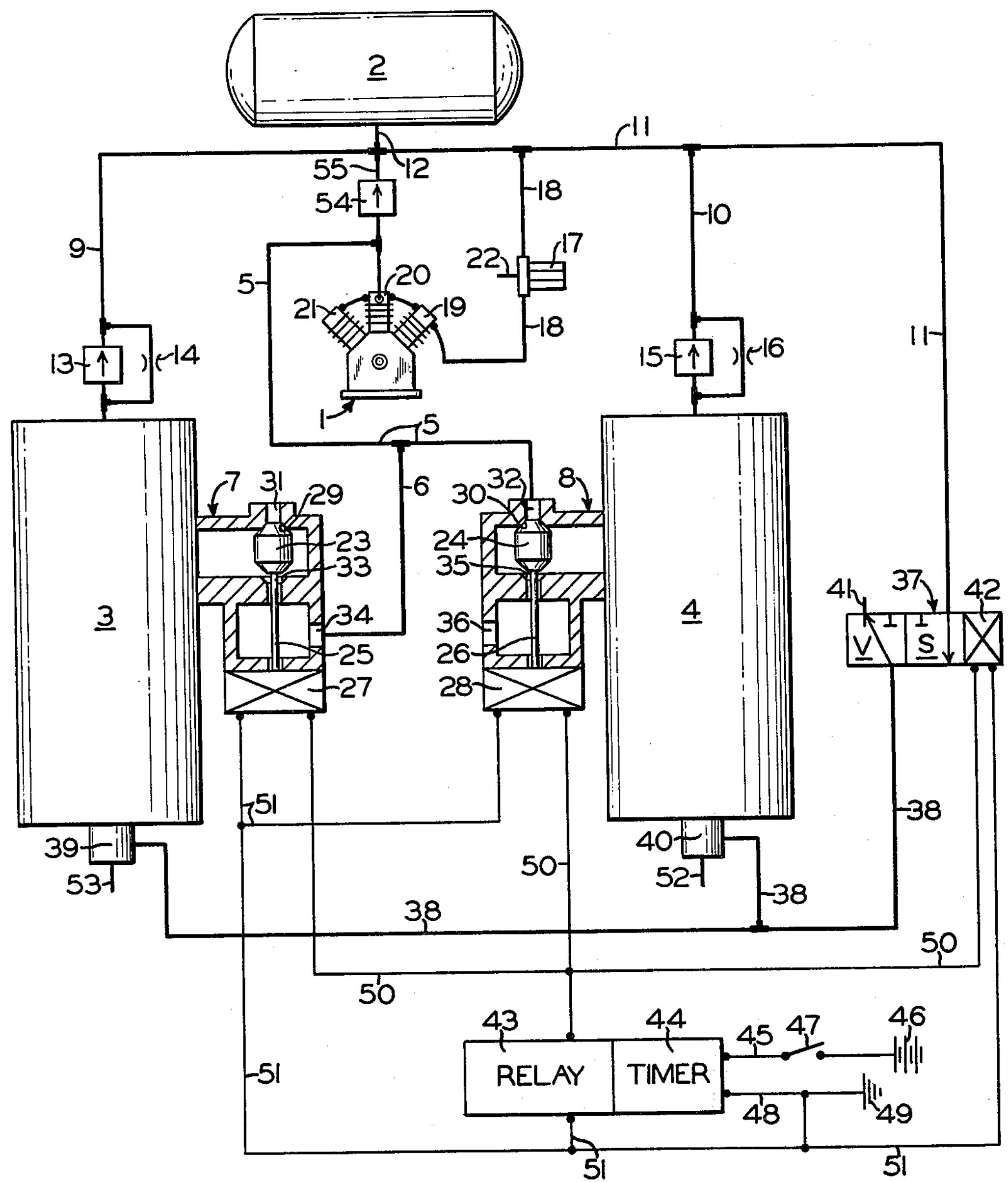
2
RELAY
TIMER
V
S

MULTIPLE FILTER APPARATUS

BACKGROUND OF THE INVENTION

Although there are moisture filter apparatus having dual filter units which are arranged so as to be alternately purged, the purging period is usually synchronized with each unloaded or rest period of the compressor, that is, during a given rest period of the compressor one filter unit is being purged while the other filter unit (which had been purged during the previous rest period) sits idle, and upon a subsequent rest period of the compressor, the roles of the two filter units are reversed. It should be noted that during each rest period of the compressor, one of the filter units sits idle, that is, it is neither being purged nor performing a filtering function. This type of arrangement is undesirable because on those occasions when the demand for compressed air is unusually high due to heavy usage, for example, the rest periods of the compressor occur less frequently or may be of such short duration of time that the filter units are not given sufficient time to be adequately purged of the moisture accumulated therein. The result is a gradual deterioration of the purging operation of the filter units and, consequently, of the quality of dryness of the air supplied to the storage reservoir.

SUMMARY OF THE INVENTION

The object of the present invention, therefore, is to provide multiple filter apparatus for removing moisture in a compressed air system in which the filter units are alternately purged for a predetermined period of time independently of the operating cycles of the compressor.

Briefly, the invention comprises a pair of filter units, though not necessarily limited to such, interposed between the compressor and the compressed air storage reservoir, and electrical timer-relay means for controlling operation of respective solenoid actuated valve devices associated with each of the filter units such that one of said valve devices is alternately operated from a supply position, in which compressed air may flow through the compressor to the storage reservoir through the respective filter unit, to a purge position in which the respective filter unit is purged of moisture accumulated therein, while the other valve device is simultaneously alternately operated between said supply and purge positions, but inversely relative to said one valve device.

The single FIGURE drawing is a schematic view, with certain components in section, of a compressed air system incorporating the multiple filter apparatus embodying the invention.

DESCRIPTION AND OPERATION

As shown in the drawing, the multiple unit filter system embodying the invention comprises an air compressor 1 for supplying compressed air for the system, said compressed air being stored in a storage reservoir 2 via a pair of filter units 3 and 4, which are arranged, as will be described in greater detail hereinafter, for alternate operation in drying the compressed air flowing therethrough during successive time periods of predetermined duration. Each of the filter units 3 and 4 contains a suitable form of desiccant (not shown) for absorbing moisture from the air flowing therethrough.

Compressed air flows from compressor 1 via a conduit or pipe 5 and a branch 6 thereof to cut off valve devices 7 and 8 operably connected to the inlet sides of filter units 3 and 4, respectively. The outlet sides of filter units 3 and 4 are connected via conduits or pipes 9 and 10, respectively, to a pipe or conduit 11 which, in turn, is connected by a branch pipe 12 to reservoir 2.

A one-way check valve device 13 providing for unrestricted flow in the direction indicated by the arrow in interposed in pipe 9 with a choke 14 arranged in parallel relation to the check valve to permit restricted flow in a reverse direction. A check valve device 15 and choke 16 are similarly interposed in pipe 10.

A conventional governor device 17 is interposed in a conduit or pipe 18 connected at one end to reservoir 2, via pipes 11 and 12, and at the other end to unloader devices 19, 20, and 21 of the compressor 1. Governor device 17 is preset to operate in a well known manner in response to a certain high pressure, when attained in reservoir 2, to an unloading position, in which fluid pressure is supplied via pipe 18 to unloader devices 19, 20, and 21 for unloading the compressor, that is, cutting out compressing action, and in response to a certail low pressure, when reached in said reservoir, to a loading position in which said unloader devices are relieved of fluid pressure via a vent 22 in the governor device for loading the compressor, that is, causing compressing action to be resumed.

Both of the cut-off valve devices 7 and 8 may be of any suitable type and in this instance are illustrated as conventional poppet type devices comprising, respectively, valve members 23 and 24 having valve stems 25 and 26 operable by solenoids 27 and 28. Valve members 23 and 24 are shown in the drawing in supply and exhaust positions, respectively, notwithstanding that both are shown seated on an exhaust valve seat 29 and a supply valve seat 30 correspondingly disposed in the respective valve devices 7 and 8. It should be noted that exhaust valve seat 29 in valve device 7 cooperates with valve member 23 to control communication between filter unit 3 and atmosphere via an atmospheric port 31, whereas supply valve seat 30 in valve device 8, though disposed in valve device 8 in a position corresponding to that of valve seat 29 in valve device 7, cooperates with valve member 24 to control communication between filter unit 4 and pipe 5 via a supply port 32 to which pipe 5 is connected.

Solenoids 27 and 28 are energizable simultaneously, in a manner to be hereinafter disclosed, to effect operation of valve members 23 and 24, through stems 25 and 26, to exhaust and supply positions, respectively. In moving downwardly to its exhaust position, valve member 23 in device 7 is seated on a supply valve seat 33 to cut off communication between filter unit 3 and branch pipe 6 via a supply port 34, to which said branch pipe is connected, and is unseated from exhaust valve seat 29 to communicate said filter unit to atmosphere via port 31. At the same time, valve member 24 in device 8, in moving downwardly to its supply position is seated on an exhaust valve seat 35 to cut off communication between filter unit 4 and atmosphere via an atmospheric port 36, and is unseated from supply valve seat 30 to communicate said filter unit with pipe 5 via supply port 32.

Pipe 11 is also connected to a supply valve device 37, which, in turn, is connected via a conduit or pipe 38 to drain valve devices 39 and 40 of filter units 3 and 4, respectively. Supply valve device 37, which is represented symbolically in the drawing, normally occupies a vent position V in which pipe 11 is cut off at the valve device and pipe 38 is communicated to atmosphere via an atmospheric port 41. Valve device 37 is operable by a solenoid 42, when energized, to a supply position S in which pipe 38 is cut off from port 41 and communicated with pipe 11 for supplying operating fluid pressure to the drain valve devices 39 and 40.

The drain valve devices 39 and 40 are of conventional type each being alternately subjected to fluid pressure and relief thereof by supply valve device 37 when solenoid 42 is energized and deenergized, respectively. Drain valve devices 39 and 40, by necessity, are constructed such that one of said drain valve devices, such as 39, for example, is maintained in a closed position, and the other drain valve device 40 is operated to an open or drain position when subjected to fluid pressure via supply valve device 37, such operation occurring in reverse order when the drain valve devices are relieved of fluid pressure via vent port 41 in said supply valve devices, that is, drain valve device 39 operating to its drain position and drain valve 40 being maintained in its closed position. Each of the drain valve devices 39 and 40 is also constructed such that when operated to its open or drain position, it remains in said drain position for a certain time period determined by equalization of opposing pressures controlling operation thereof, that is, the pressure prevailing in the filter unit and the pressure supplied thereto or relieved therefrom by valve 37.

Energization and deenergization of the several solenoids 27, 28, and 42 is effected and controlled by an electrical relay device 43 which, in turn, is operably controlled by a timer 44, both of which are commercially available and, therefore, of conventional type. Timer 44 may be an electrothermal type which in response to alternate heating and cooling of a resistor element (not shown) causes respective opening and closing, with snap action, of contacts (not shown) of relay 43.

Timer 44 is connected via an electrical conductor 45 to an electrical power source such as a battery 46, for example, with a switch 47 interposed in said conductor, said timer being connected via an electrical conductor 48 to a ground 49. Electrical energy from relay 43 is supplied to solenoids 27, 28, and 42 via a multi-branch electrical conductor 50, said solenoids and said relay being grounded to ground 49 via a multi-branch electrical conductor 51 connected to conductor 48.

During operation, it will be assumed that the compressor 1 operates cyclically under the control of the governor device 17 to maintain compressed air in reservoir 2 at a pressure within the high and low pressure limits determined by the governor device. To initiate operation of the filter units 3 and 4, switch 47 is closed which actuates operation of timer 44 which, in turn, causes cyclical closing and opening of the relay device 43 for effecting corresponding cyclical energization and deenergization of the solenoids 27, 28, and 42 concurrently, the duration of each cycle being determined by the type and quality of the heat element (not shown) in said timer device.

As shown in the drawing, cut-off valve devices 7 and 8, with solenoids 27 and 28 deenergized, occupy respective supply and exhaust positions. Thus compressed air from compressor 1 may flow through filter unit 3 and unrestrictedly through check valve 13 to reservoir 2. On the other hand, with cut-off valve device 8 in its exhaust position, supply of compressed air from compressor 1 through filter unit 4 is cut off, while compressed air flows reversely from reservoir 2 at a restricted rate through choke 16, filter unit 4 and exhaust port 36 for purging said filter unit.

At this time supply valve 37 is in its vent position V in which both drain valves 39 and 40 are vented to atmosphere via vent port 41 in said supply valve and are in their respective closed dispositions, it being assumed to be the initial cycle of operation of the filter units 3 and 4.

When the contacts (not shown) of relay 43 are closed by action of timer 44, solenoids 27, 28, and 42 are concurrently energized. Valve element 23 of cut-off valve device 7 operates to cut off supply of compressed air to reservoir 2 via filter unit 3 and allows reverse flow, at a restricted rate through choke 14, of compressed air from reservoir 2, through filter unit 3, to atmosphere via exhaust port 34, thereby purging said filter unit of moisture accumulated therein. In the meantime, valve element 24 of cut-off valve device 8 operates to cut off purging of filter unit 4 via exhaust port 36 and opens supply port 32 to permit supply of compressed air to reservoir 2 via filter unit 4.

At the same time, with solenoid 42 energized, supply valve device 37 is operated to its supply position S in which drain valves 39 and 40 are supplied with operating pressures, which, at this time, acts to maintain drain valve 39 in its closed position and to cause operation of drain valve 40 to its drain position, the latter remaining in said drain position for a predetermined period of time, as above explained, said period of time usually being only of such duration as to permit a strong blast of air through a drain port 52 in said drain valve 40 (or 53 in drain valve 39) sufficient for blowing out moisture accumulated in the bottom of the drain valve.

When timer 44 operates to open the contacts of relay 43, the operation for the first portion of the cycle, as above described, is reversed. That is, solenoids 27, 28, and 42 are deenergized, as a result of which purging of filter unit 3 is terminated, supply of compressed air through filter unit 3 to reservoir 2 is restored, while supply of compressed air to reservoir 2 through filter unit 4 is terminated and purging of filter unit 4 is initiated. Drain valve devices 39 and 40 are relieved of fluid pressure via vent 41 of supply valve 37 which causes drain valve 39 to remain closed and drain valve 40 to be momentarily opened.

Thus, in cyclical fashion, as timer device 44 and relay 43 alternately energize and deenergize solenoids 27, 28, and 42, filter units 3 and 4 are alternately conditioned for filtering compressed air flowing to reservoir 2 and for being purged of moisture accumulated therein, so that while one unit is filtering the other is being purged, and drain valve devices 39 and 40 are alternately opened in synchronization with the respective filter unit being purged. The filtering, purging, and draining operations are accomplished independently of the cyclical compressor operation, thereby assuring a supply of highly dried compressed air.

In the event that one or both of the filter units 3 and 4 malfunctions with respect to flow of compressed air therethrough to reservoir 2, a bypass check valve device 54 is interposed in a branch conduit or pipe 55 between compressor 1 and said reservoir, whereby supply of compressed air to the reservoir may bypass the malfunctioning filter unit or units. Bypass check valve device 54 opens when the back pressure in the malfunctioning filter unit or units build up to a pressure greater than that at which said bypass valve device is set to open.

We claim:

1. Multiple filter apparatus for use in a compressed air system for removing moisture from compressed air supplied from a compressor to a storage reservoir, said multiple filter apparatus comprising:

a. a pair of parallel conduits via which compressed air may flow in one direction from the compressor to the storage reservoir and in a reverse direction, relative to said one direction, to atmosphere;

b. a pair of filter units interposed, respectively, in said pair of conduits for removing and accumulating moisture from compressed air flowing therethrough in said one direction;

c. a pair of cut-off valve devices interposed, respectively, in said conduit means in serial relation between the compressor and said filter units, each of said cut-off valve devices being operable to a supply position in which flow of compressed air through the respective filter unit occurs in said one direction and each being operable to a cut-off position in which flow in said one direction is cut off and flow in said reverse direction is effected;

d. operating means for effecting alternate periods of operation of one of said cut-off valve devices to its said supply and cut-off positions concurrently with alternate periods of operation of the other of said cut-off valve devices to its said cut-off and supply positions, respectively, and vice versa;

e. timing means for limiting said alternate periods of operation to intervals of uniform time duration;

f. respective choke and check means serially interposed in each of said parallel conduits between the respective filter units and the reservoir to effect unrestricted flow of compressed air in said one direction and to limit flow of compressed air through filter unit in said reverse direction to a preselected restricted rate; and g. respective drain valve devices connected to each of said filter units and each being operable to a closed position, in which the respective filter unit is closed to atmosphere, and to an open position, in which moisture condensate accumulated in the respective filter unit is expelled to atmosphere, by said operating means concurrently with said alternate operation of the cut-off valve device connected to one of the filter units to its said supply and cut-off positions, respectively, and vice versa, in reverse order relative to alternate operation of the cut-off and drain valve device connected to the other filter unit.

2. Multiple filter apparatus, as set forth in claim 1, wherein one of said drain valve devices is operable to its said open position and the other to its said closed position, concurrently, in response to actuating fluid pressure, and alternately to their respective closed and open positions in response to relief of such actuating fluid pressure therefrom.

3. Multiple filter apparatus, as set forth in claim 2, wherein each of said drain valve devices is of the pressure equalizing type for automatically resuming its said closed position, subsequently to operation thereof to its said open position, after a predetermined time period.

4. Multiple filter apparatus, as set forth in claim 3, further characterized by a supply valve device having a normal vent position, in which said drain valve devices may be relieved of said actuating fluid pressure, and being operable by said operating means to a supply position in which actuating fluid pressure may be supplied to said drain valve devices.

5. Multiple filter apparatus, as set forth in claim 4, wherein said cut-off valve devices and said supply valve device are electro-magnetically operable, and said operating means comprises:

a. respective solenoids for each of said cut-off valve devices and said supply valve device, said solenoids being effective, when energized, for simultaneously operating one of said cut-off valve devices to its said cut-off position, the other of said cut-off valve devices to its said supply position, and said supply valve device to its said supply position, b. said one cut-off valve device, said other cut-off valve device, and said supply valve device being operative, upon deenergization of said respective solenoids, to said supply position, said cut-off position and to said vent position, respectively;

c. common electrical circuitry including an electrical energy source connected to said respective solenoids;

d. electrical relay means interposed in said circuitry for effecting alternate energization and deenergization of said circuitry; and e. electrical timing means interposed in said circuitry between said relay means and said electrical energy source for effecting said alternate energization and deenergization at said intervals of uniform time duration.

6. Multiple filter apparatus, as set forth in claim 5, wherein said electrical timing means comprises electrical contacts and resistor element interposed in said circuitry, said contacts being alternately opened and closed by alternate heating and cooling of the resistor element.

* * * * *